Oct. 28, 1924.
W. R. McGOWEN
1,513,257
AUTOMOBILE SIDE BUMPER
Filed Nov. 9, 1923
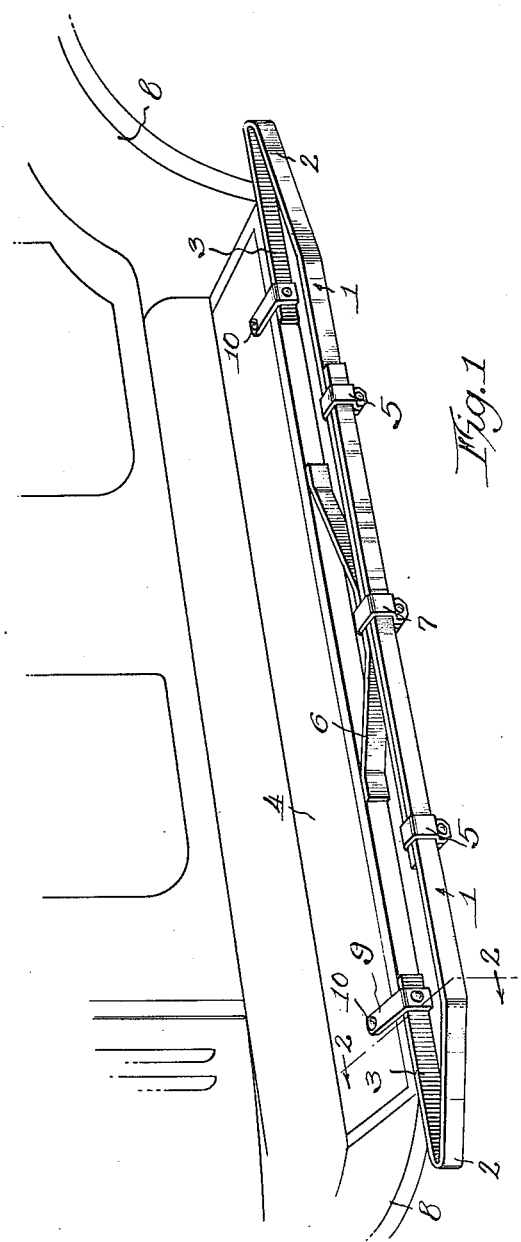
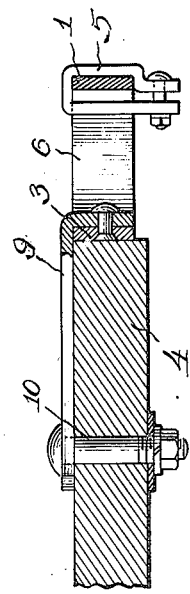
Inventor,
William R. McGowen,
By Fields, Buckley, Poole & Scott Attys.
Witness:
Chas. B. Koursh Patented Oct. 28, 1924.

1,513,257

UNITED STATES PATENT OFFICE.

WILLIAM R. McGOWEN, OF CHICAGO, ILLINOIS.

AUTOMOBILE SIDE BUMPER.

Application filed November 9, 1923. Serial No. 673,639.

*To all whom it may concern:*

Be it known that I, WILLIAM R. McGOWEN, a citizen of the United States, and a resident of Chicago, in the county of Cook and State of Illinois, have invented certain new and useful Improvements in Automobile Side Bumpers, of which the following is a specification.

This invention relates to improvements in bumpers for automobiles and more particularly to a novel protective device designed to be mounted along the sides of an automobile, for the purpose of protecting the same, and particularly the fenders and running board against damage from side collision, either in the form of direct impacts, glancing blows or "side swipes."

The object of the invention is to provide a practical and useful device which may be readily applied, preferably to the running boards of automobiles, and which are capable of affording adequate protection without being cumbersome or marring the appearance of the automobile.

A preferred embodiment of the invention is disclosed in the accompanying drawings, in which—

Figure 1 is a perspective view of the side of an automobile with the bumper attached to the running board, and Figure 2 is a detailed view in vertical section taken on line 2, 2 of Figure 1.

The bumper consists primarily of a flat elongated loop preferably made up of one or more flat metal bars of spring steel. The main part of the bumper consists of two complementary bars 1, 1 clamped together to form the complete device. Each bar 1 is straight throughout the greater part of its length, with one end portion bent in V-shape, forming the two end portions 2, 2 of the bumper, together with the short free ends 3, 3, spaced rearwardly from the main or outer impact portion. These free ends are adapted to bear flatwise along the edges of the running board 4, of the automobile and to be fastened thereto by members presently to be described. The straight end portions of the bars 1 overlap each other for a considerable distance throughout the central portion of the bumper, and are secured together by means of clamps 5, 5.

At the center of the bumper is mounted a short bar or leaf 6, curved or shaped to extend lengthwise and transversely of the space between the outer bar and the edge of the running board. This auxiliary spring element or bar is secured in place by a clamp 7. The free ends of the spring are flattened to slide along the edge of the running board in the event of collision, thus assisting the main bar to resist the force of the impact. Owing to the location of the bumper it is essential that its transverse dimension be reduced to a minimum, hence the addition of the central reinforcing or auxiliary spring element, to strengthen the main bar, which otherwise would contact with the edge of the running board.

The shaping of the end portions 2, 2 of the bumper is important. The loops or bends at the extremities of the bars 1, 1, are relatively sharp, the angle thus formed between the attaching ends 3, 3, and the main portions of the bar being acute, with the latter inclined to the ends 3, 3 and the central portion of the impact member.

Thus the ends of the bumper may be described as pointed, with the extremities lying in the plane of the surface against which the bumper is applied. In this manner, sloping contact surfaces are provided at each end, so that objects striking or struck by, either end of the bumper will tend to be deflected outward, thus diverting the force which otherwise might be destructive in effect.

By reason of the overlapping of the ends of the main bars 1, 1, the bumper is capable of extension lengthwise, thereby permitting it to be adjusted to different lengths of running board. As shown in Figure 1, a desirable position for the bumper is such that the extremities project a short distance beyond the ends of the running board, thereby affording protection for the portions of the fenders 8, 8, adjacent the points of their fastening to the running board.

The bumper is secured to the running board by means of angle straps 9, 9, which are riveted crosswise of the extremities of the rear end portions 3, 3 and providing rearwardly extending members which lie flatwise along the top surface of the running board. Bolts 10, 10, pass through the free ends of the straps 9, 9, and the running board, thereby clamping the bumper firmly to the edge thereof.

This method of fastening is preferred since the straps hold the ends 3, 3 tightly against the edge of the running board, and at the same time provide a strong support, since any weight placed upon the bumper is resisted by the straps, which tend to fulcrum at the edges of the board, and thus relieve the strain upon the bolts. It is obvious that persons entering and leaving the vehicle will invariably step on the bumper, hence the necessity of a firm support.

While the advantages of a device affording protection to the sides of vehicles can be readily appreciated, the combination of the features herein disclosed provides a device of practical utility and pleasing appearance.

I claim as my invention:

1. A bumper of the character described comprising a resilient impact bar adapted to extend parallel to and spaced from a supporting member and having straight and inclined portions toward the plane of said supporting member, and thence bent at an acute angle to form substantially pointed ends, and inwardly turned extremities adapted to be secured in flatwise contact to said supporting member.

2. A bumper adapted to be secured to the running board of a vehicle and comprising a resilient impact bar having a central portion extending parallel with the edge of said board and rearwardly and inwardly bent end portions adapted to be secured flatwise to the edge of said board and an auxiliary spring bar secured midway of its ends to the central portion of said impact bar and diverging therefrom to engage at its free ends the edge of the running board.

3. A bumper adapted to be mounted along the running board of a vehicle and comprising an impact bar, having a straight central portion extending parallel to the edge of said board and end portions inclined toward said edge and bent sharply inwardly through an acute angle to form attaching portions extending flatwise along said edge and means for securing said attaching members to said running board.

4. A bumper adapted to be mounted along the running board of an automobile, and comprising an impact bar extending parallel to the edge of said board and having sloping end portions terminating in V-shaped bends forming rearwardly disposed free ends adapted to be secured in flatwise contact against the edge of said board, and an auxiliary bar secured to the central portion of said impact bar and adapted to engage the edge of said running board intermediate said free ends.

5. A bumper adapted to be mounted along the running board of an automobile, and comprising an impact bar extending parallel to the edge of said board and having its end portions bent rearwardly and inwardly to form rearwardly disposed free ends adapted to bear flatwise against the edge of said board, and straps secured to said free ends and extending transversely of the top surface of said board, and fastening members at the free ends of said straps.

In witness whereof, I hereunto subscribe my name this 22d day of September, A. D., 1923.

WILLIAM R. McGOWEN.